US012128666B2

(12) United States Patent
Lindenfelzer et al.

(10) Patent No.: US 12,128,666 B2
(45) Date of Patent: Oct. 29, 2024

(54) MULTI-LAYER THERMOFORMED POLYMERIC FOAM ARTICLES AND METHODS

(71) Applicant: MuCell Extrusion, LLC, Woburn, MA (US)

(72) Inventors: Mark E. Lindenfelzer, Milton, MA (US); Simon Dominey, Gloucestershire (GB); Samuel Edward Dix, Newton, NH (US); Jere R. Anderson, Newburyport, MA (US)

(73) Assignee: MuCell Extrusion, LLC, Woburn, MA (US)

(*) Notice: Subject to any disclaimer, the term of this patent is extended or adjusted under 35 U.S.C. 154(b) by 0 days.

(21) Appl. No.: 14/501,004

(22) Filed: Sep. 29, 2014

(65) Prior Publication Data

US 2016/0089852 A1    Mar. 31, 2016

(51) Int. Cl.
*B29C 51/14* (2006.01)
*B29C 48/08* (2019.01)
(Continued)

(52) U.S. Cl.
CPC ............... *B32B 5/18* (2013.01); *B29C 48/08* (2019.02); *B29C 48/914* (2019.02); *B29C 51/02* (2013.01);
(Continued)

(58) Field of Classification Search
CPC ....... B29C 51/14; B29C 51/002; B29C 51/08; B29C 51/00
(Continued)

(56) References Cited

U.S. PATENT DOCUMENTS 2,377,946 A    6/1945  Leary
5,317,119 A *  5/1994  Ayres .................... F41J 1/01
                                                    426/243

(Continued)

FOREIGN PATENT DOCUMENTS

WO    WO-0136521 A2 *  5/2001  ............. C08J 9/122
WO    WO 01/89794 A1    11/2001

OTHER PUBLICATIONS

Invitation to Pay Additional Fees for International Application No. PCT/US2015/052857 dated Apr. 5, 2016.
(Continued)

*Primary Examiner* — Jeffrey M Wollschlager
*Assistant Examiner* — Xue H Liu
(74) *Attorney, Agent, or Firm* — Wolf, Greenfield & Sacks, P.C.

(57) ABSTRACT

Thermoformed polymeric foam articles and methods of forming the same are described. In some embodiments, thermoformed articles are produced from multi-layer foamed sheet where the formed article has a density equal to or less than the precursor multi-layer sheet. One of the layers of the thermoformed article may be a polymer foam layer having a density reduction between 5% and 50% as compared to the solid polymer. Such polymer foam layers can be referred to as "medium density" or "high density" foams. Advantageously, the methods described herein are practical for commercial use and, for example, can be used to produce a variety of thermoformed articles suitable for use in many different applications.

12 Claims, 2 Drawing Sheets

(51) Int. Cl.
| | |
|---|---|
| B29C 48/88 | (2019.01) |
| B29C 51/02 | (2006.01) |
| B32B 5/18 | (2006.01) |
| B32B 5/22 | (2006.01) |
| B32B 5/32 | (2006.01) |
| B32B 27/06 | (2006.01) |
| B32B 27/08 | (2006.01) |
| B32B 27/30 | (2006.01) |
| B32B 27/32 | (2006.01) |
| B32B 27/34 | (2006.01) |
| B32B 27/36 | (2006.01) |
| B29C 48/00 | (2019.01) |
| B29C 48/21 | (2019.01) |
| B29C 48/28 | (2019.01) |
| B29C 48/295 | (2019.01) |
| B29C 48/355 | (2019.01) |
| B29C 48/90 | (2019.01) |
| B29K 23/00 | (2006.01) |
| B29K 25/00 | (2006.01) |
| B29K 67/00 | (2006.01) |
| B29K 105/00 | (2006.01) |
| B29K 105/04 | (2006.01) |

(52) U.S. Cl.
CPC ............... *B32B 5/22* (2013.01); *B32B 5/32* (2013.01); *B32B 27/065* (2013.01); *B32B 27/08* (2013.01); *B32B 27/302* (2013.01); *B32B 27/304* (2013.01); *B32B 27/308* (2013.01); *B32B 27/32* (2013.01); *B32B 27/322* (2013.01); *B32B 27/34* (2013.01); *B32B 27/36* (2013.01); *B32B 27/365* (2013.01); *B29C 48/0018* (2019.02); *B29C 48/21* (2019.02); *B29C 48/28* (2019.02); *B29C 48/295* (2019.02); *B29C 48/355* (2019.02); *B29C 48/906* (2019.02); *B29C 51/14* (2013.01); *B29K 2023/12* (2013.01); *B29K 2025/06* (2013.01); *B29K 2067/003* (2013.01); *B29K 2105/04* (2013.01); *B29K 2105/041* (2013.01); *B29K 2105/046* (2013.01); *B29K 2105/256* (2013.01); *B29K 2995/0063* (2013.01); *B32B 2266/0228* (2013.01); *B32B 2266/0235* (2013.01); *B32B 2266/0242* (2013.01); *B32B 2266/025* (2013.01); *B32B 2266/0257* (2013.01); *B32B 2266/0264* (2013.01); *B32B 2266/08* (2013.01); *B32B 2307/50* (2013.01); *B32B 2307/72* (2013.01); *B32B 2435/00* (2013.01); *B32B 2439/00* (2013.01); *B32B 2439/70* (2013.01); *B32B 2509/10* (2013.01); *B32B 2605/00* (2013.01); *B32B 2605/18* (2013.01)

(58) Field of Classification Search
USPC .................................................. 264/241, 321
See application file for complete search history.

(56) References Cited

U.S. PATENT DOCUMENTS

| | | | |
|---|---|---|---|
| 5,369,135 | A | 11/1994 | Campbell et al. |
| 5,380,481 | A | 1/1995 | Oberle, Jr. |
| 6,245,267 | B1 | 6/2001 | Kreiser et al. |
| 8,075,835 | B2 | 12/2011 | Campbell et al. |
| 2002/0172739 | A1 | 11/2002 | Anderson et al. |
| 2009/0104302 | A1 | 4/2009 | Irwin |
| 2011/0274900 | A1* | 11/2011 | Megally .............. B29C 44/1228 428/215 |

OTHER PUBLICATIONS

International Search Report and Written Opinion for International Application No. PCT/US2015/052857 dated Jun. 7, 2016.
International Preliminary Report on Patentability (Chapter 1) for International Application No. PCT/US2015/052857 dated Apr. 13, 2017.
PCT/US2015/052857, Apr. 5, 2016, Invitation to Pay Additional Fees.
PCT/US2015/052857, Jun. 7, 2016, International Search Report and Written Opinion.
PCT/US2015/052857, Apr. 13, 2017, International Preliminary Report on Patentability (Chapter 1).

* cited by examiner

MULTI-LAYER THERMOFORMED POLYMERIC FOAM ARTICLES AND METHODS

FIELD

The invention relates generally to multi-layer thermoformed polymeric foam articles and methods of forming the same.

BACKGROUND

Polymer foams have a plurality of cells or voids within a polymer matrix. Foamed products may use less material than an equivalent solid structure which can result in lower cost products with a reduced carbon footprint. Foaming can also be used to reduce article weight.

To classify different types of foam, it is common to refer to the size of the cells. In addition, foams can be classified by comparing their density with that of a solid polymer. For example, medium and high density foams typically have a density of more than 500 kg/m$^3$ and/or no more than 49% reduced in density as compared to solid polymer. These foams are different than common low density foams, such as seen in disposable polystyrene plates, which often are more than 70% reduced in density as compared to the solid polymer.

Polymer foams can be produced by a wide range of techniques—two examples are by introduction of physical gases during the extrusion process, and by adding chemical blowing agents that are activated by heat during extrusion.

Flat polymeric sheet can be converted into shaped products by a thermoforming process. There are several variations of this process. Offline—where the sheet is wound into a roll then unwound into the thermoformer. Inline—where the sheet is extruded directly from the flat die of the extrusion line and via various rolls fed into the thermoforming station. In general, thermoforming processes take the sheet and heat it to a required level of softness, then through the application of pressure force the sheet into a mold of the specified shape. There are variations of the basic method such as vacuum forming, pressure forming and plug assist.

A special version of offline thermoforming is the "Form Fill Seal" or FFS, in this process the thermoformed container is also filled with product (normally food) and sealed shut immediately after the thermoforming section.

As noted above, thermoforming is a thermoplastic manufacturing process where a plastic sheet is heated to a softening point or forming temperature, formed to the desired shape in a mold, and trimmed to create the finished product. The sheet is pre heated in an oven to a high-enough temperature that it can be pushed or stretched into a female mold or over a male mold. When in the mold, it is cooled so as to hold its final shape.

Thermoforming can be done with a single sheet manually positioned in the heating/forming station; or, more commonly in industry for high-volume applications, large production machines are utilized to heat and form the plastic sheet and trim the formed parts from the sheet in a continuous automated process. Small shapes less than 1 inch across can be made and so can very large parts greater 3 feet across. In addition, multi-cavity tooling is common where multiple small or medium size parts may be produced with each cycle of the machine.

Thermoformed products can be formed from thin sheet or thick sheet. Thin-sheet thermoforming is commonly used to manufacture items such as disposable cups, containers, lids, trays, blisters, and clamshells. Thermoformed products may be used, for example, in the food and medical industries and for retail display or protection in shipping. Thick-sheet thermoformed products includes parts for cars, refrigerator liners, white goods paneling, pickup truck beds, and aircraft interiors.

Sheet is supplied to the thermoformer. For thin sheet thermoforming, the plastic sheet is fed from a roll or from an extruder. For thick sheet thermoforming, the sheet is fed from a stack of pre-cut individual sheets or directly from the extruder.

For in-line or off-line thermoforming, the methods both utilize a set of indexing chains that incorporate pins, or grips, that hold the sheet and transport it through an oven for heating to forming temperature. The hot sheet then indexes into a form station where a mating mold and pressure-box close on the sheet, with vacuum then applied to remove trapped air and to pull the material into the mold to form the plastic to the detailed shape of the mold. In some cases pressurized air or plug-assists, or a combination, are used in addition to vacuum in order to provide more control of material distribution and thicknesses in the finished part. The formed plastic part is cooled whilst in the mold so that it will substantially retain its shape after removal from the mold. After the forming process, the part is ejected from the mold. This can be done with a blast of air from the vacuum side of the mold as the form tooling opens which can also help to break the vacuum and assist the formed parts off or out of the mold. Stripper plates and other device are also used. The sheet containing the formed parts then indexes into the cut and trim station, where a die cuts the parts from the sheet. The sheet skeleton that remains after the parts are removed (typically parts drop down) is typically wound onto a take-up reel for reprocessing or scrap or it can be continuously fed into an inline granulator to produce chips for feeding back into an extruder.

In most cases, the completed parts are collected and stacked ready for use in automated printing, packing or filling machinery.

Because the skeleton trim can be a significant percentage of the plastic used, this trim is normally recycled. Often, the recycled trim is chopped and fed directly back to the extruder. One of the disadvantages of chemical foaming this sheet is that residual chemicals are in the recycled trim leading to variability in foam level and control as new sheet is extruded.

Many materials can be used to make the thermoforming mold but probably the most common is machined or cast aluminum. In either case fine details require a machining step and in some cases hand finishing.

Many patents relate to the thermoforming method and equipment (e.g., U.S. Pat. Nos. 2,377,946; 5,380,481; US 20090104302).

Those experienced in the art generally accept that the pressure and temperature employed in thermoforming will result in the compression of foamed sheet resulting in a thermoformed article having a higher density than the precursor sheet. This effect is also referred to in the literature. Various secondary techniques have been employed to counter act this effect, e.g., as described in U.S. Pat. No. 6,245,267.

Extrusion is a process for converting thermoplastic materials from solid to fluid states and preforming them in a die and subsequently cooling to create as finished form. The finished form is in some cases effectively the final product and, in other cases, a precursor to the final product (e.g., as in thermoforming above).

First, plastic pellets are fed from a hopper into a jacketed barrel with a rotating screw. As the screw turns, it transports, melts, and pumps the plastic. From there, the molten material is forced through a die that shapes it into a specified cross-section, producing parts with a potentially infinite length but a defined cross section. During extrusion, plastics transform from solid to liquid and back again without sacrificing their distinctive properties. As a result, scrap parts can be ground and re-extruded with minimal degradation, making extrusion a popular method for recycling plastic waste. Plastics come in many different chemical forms, primarily gas or oil based. In addition, biodegradable plastics are increasingly common. It is also possible to add colorants, property modifiers and fillers.

Single screw and twin screw extruders are commonly used. In these extruders, many factors affect the performance e.g., screw geometry, screw RPM, and barrel heater temperature profile.

The screw performs feeding/conveying, melting, and pumping the plastic before it pumps it through the die. A variable speed drive/motor turns the screw, which is enclosed in a tight fitting barrel. The first section is the feed, located at the rear of the screw, where a hopper delivers resin pellets into the $1^{st}$ section of the screw. As the screw turns, it behaves as an Archimedean screw and draws the plastic forward. The "flights" of the screw provide the motive force. Barrel heaters outside the OD of the barrel help to melt the plastic, but typically most of the melting energy comes from the friction heat generated by the screw. This melting section of the screw is known as the transition, or melt, section. Many different designs are used in this section all trying to give efficient complete melting of the plastic. A barrier screw is one type of configuration specifically designed for good melting.

After the plastic is melted, it is conveyed to the metering section which is for pumping and pressure development. Additional mixing is often included in this region. Some twin screw extruders are not very good at pumping so an additional pump is added to the end of the extruder, to provide the majority of the pressure building ("melt pump"). Single screw extruders can also use a melt pump if the application demands it.

After the extruder and any additional devices, such as melt pump or static mixer, the polymer flows to the die. Hundreds or thousands of different die designs exist depending on the final product or application. For flat sheet, the die and adapter combination often with a feed block take the round "rod" of molten polymer and convert it to a flat rectangular section typically the thickness is much less than the width.

When the product leaves the die, it can be immediately cooled, which can be primarily achieved by a series of cooling rolls when sheet is extruded. The configuration of the rolls is a function of the application and type of polymer. Some popular configurations are vertical rolls, horizontal rolls, 45o rolls and "J" stack. After cooling the sheet can be wound up as a roll or reel. For thick sheet winding may not be possible in which case it can be cut to a specific length and stacked.

In the prior art of thermoforming high or medium density foamed sheet, it is well known by those skilled in the art that the thermoforming process results in a finished article with a density greater than the precursor sheet. Further it is known that the thermoformed product will have a wall thickness less than the precursor sheet. This increase in density and/or reduction in thickness may arise from cell elongation or cell collapse. Either of these effects can reduce the improved mechanical stiffness that was an advantage of the foamed precursor sheet.

Most persons skilled in the art will be surprised to learn that under certain conditions a foamed thermoformed article can be produced with a lower density than the foamed precursor sheet. This surprising discovery was described in International Publication No. WO 01/36521 (Applicant: Trexel Inc.). In practice this effect has been difficult to realize in most applications, which is one of the reasons why this discovery is largely unknown. A practical method that can be used in different applications and takes advantage of this discovery would be desirable.

SUMMARY

The invention relates generally to multi-layer thermoformed polymeric foam articles and methods of forming the same.

In one aspect, an article is provided. The article comprises a thermoformed article formed from a multi-layer precursor sheet. The thermoformed article includes multiple layers, wherein one of the layers of the thermoformed article is a polymer foam layer having a density reduction between 5% and 50% as compared to the solid polymer. The thermoformed article has a density equal to or less than a density of the multi-layer precursor sheet.

In another aspect, an article is provided. The article comprises a thermoformed article formed from a multi-layer precursor sheet. The thermoformed article including multiple layers, wherein the thermoformed article includes a polymer foam layer having a thickness equal to or greater than a thickness of a corresponding polymer foam layer in the multi-layer precursor sheet from which the polymer foam layer in the thermoformed article is formed.

In another aspect, a method of forming a foam article comprising is provided. The method comprises thermoforming a multi-layer precursor sheet to form a thermoformed article including multiple layers, wherein one of the layers of the thermoformed article is a polymer foam layer having a density of reduction between 5% and 50% as compared to the solid polymer, and wherein the thermoformed article has a density equal to or less than a density of the multi-layer precursor sheet.

A multilayer precursor sheet can be used to provide a practical method of creating a thermoformed article with a density lower than the precursor multilayer sheet.

Some embodiments utilize a multilayer sheet of two or more layers wherein one or more layers are foamed can be thermoformed where the finished article has areas of the foamed layer(s) have lower density than the precursor sheet.

In some embodiments, an equally surprising new discovery that the same result can be produced with inline thermoforming without the requirement to produce rolls in advance and with no need to let the rolls "rest" for a period. This result has been further described in commonly-owned U.S. Patent Application Serial No. to be assigned, entitled "Thermoformed Polymeric Foam Articles and Methods", filed on the same day as the present application, which is incorporated herein by reference in its entirety.

Some embodiments involve the application of this technique to Form Fill Seal "FFS" methods of roll stock thermoforming. In this method, a previously manufactured roll of sheet is re-heated then formed into a container that is then immediately filled with contents (normally food) and then immediately sealed. This invention can produce a reduction in density lower than the precursor foamed sheet.

In another embodiment, the thermoformed article can have sections that are thicker than or equal to the precursor sheet.

In some embodiments, density reduction of the thermoformed article to lower densities than the precursor sheet is present in polyolefin sheets.

Some embodiments are used in combination with the controlled cell distribution in microcellular foams allows the thermoforming of deep draw articles not possible with common foam sheet technologies.

In some embodiments, the precursor foamed sheet may be made of PS, ABS, SAN and similar polymers.

In some embodiments, similar density reductions are possible converting sheet made from Polyamide and PLA or PHA.

In some embodiments, a modified plug shape and plug material is used for thermo formers equipped with "plug assist" to promote a controlled distribution density reduction in the thermoformed article that gives a lower density than the precursor sheet.

In some embodiments, sheet manufactured from PVC shows the same density reductions.

In some embodiments, the thickness and light weight of the microcellular foamed sheet that makes the sheet stiffer than an equivalent weight of solid sheet is used to help prevent sheet sag in the thermoformer. The methods then allow the thermoformed article to have a density equal to or lower than the precursor sheet.

In some embodiments, the density of different sections of the article may be controlled to produce areas close to solid that may be useful if one of the layers is a seal layer.

In some embodiments, the thermoformed article has a foam layer density reduction of at least 10% compared to the solid polymer or at least 30% or at least 49%.

In some embodiments, the thermoformed article has a foamed layer with a density of at least 2% less than the same foamed layer in the precursor sheet or at least 3% less or at least 6% less.

In further some embodiments, the thermoformed article has a foamed layer with a density of at least 10% less than the same foamed layer in the precursor sheet or at least 20% less or at least 35% less or at least 49% less.

Various embodiments are envisioned where the precursor multi-layer foamed sheet has a thickness of between about 0.3 mm and 8.0 mm or between about 0.3 mm and 2.00 mm In various embodiments, the precursor sheet foam layer has a predominantly closed cell structure and the article foam layer has a predominantly closed cell structure.

In some embodiments, methods are provided that involve forming multi-layer sheet with one or more foam layers into an article where the foam layer(s) have a density equal to or less than the same foam layer of the precursor sheet or multi-layer sheet with one or more foam layers formed into an article where the foam layer(s) have a thickness equal to or greater than the same foam layer of the precursor sheet.

The invention works largely independent of the polymer type although different grades of a given polymer can have different degrees of foaming. In this respect, the foaming process follows established technology for physical and chemical foaming where it is know that most polymers can be foamed. For example, suitable polymers include polyolefin materials (including polyethylene and polypropylene), polystyrene, melt index of >1 and fractional melt polymers, ABS, PHA, PLA, starch-based bio polymers, polyamide, polyvinylchloride, polycarbonate, polyester, fluoropolymers, PVDF (and similar polymers) and acrylics. Homopolymers and co polymers are both possible.

Various additives are often added to the base polymer to modify the characteristics or performance of the sheet or article. In some embodiments, these additives do not impede the and, in some cases, help with the nucleation of the foam layer. Examples include bbt are not limited to talc, titanium dioxide, calcium carbonate or combinations of these materials.

DETAILED DESCRIPTION

Figure 1:
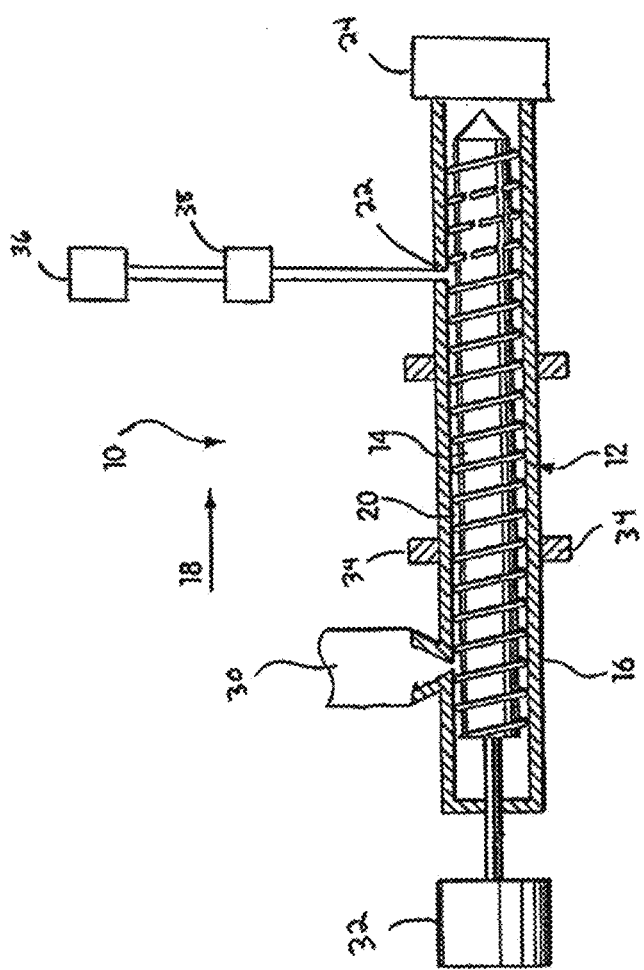
FIGS. 1 and 1A illustrate a polymer processing system according to an embodiment.

Multi-layer thermoformed polymeric foam articles and methods of forming the same are described. In some embodiments, thermoformed articles are produced from a precursor multi-layer sheet, wherein the thermoformed article has a density equal to or less than the precursor multi-layer sheet. One of the layers of the thermoformed article may be a polymer foam layer having a density reduction between 5% and 50% as compared to the solid polymer. Such polymer foam layers can be referred to as "medium density" or "high density" foams. Advantageously, the methods are practical for commercial use and, for example, can be used to produce a variety of thermoformed articles suitable for use in many different applications.

The precursor foamed sheet includes two or more layers (e.g., 2-9 layers). In some cases, one or more foam layers in the precursor sheet is adjacent to at least one solid polymer layer; and, in some cases, one or more foam layers is/are sandwiched between two adjacent solid polymer layers. Without being bound by any theory, it is believed that solid polymer layers may provide support to a foam layer in the sheet (e.g., an adjacent foam layer) so that the cells in the foam layer can resist collapse during thermoforming. For example, rather than collapsing, the cells can expand and/or elongate to increase in volume which results in the thermoformed article (e.g., in sections thereof) having a lower density than the precursor sheet.

In some embodiments, the precursor sheet has a 4 layer construction (e.g., ABCA in which layer A is a solid polymer layer, layer C is a polymer foam layer, and layer B is a solid polymer layer) or a 5 layer construction (e.g., ABCBA in which layer A is a solid polymer layer, layer C is a polymer foam layer, and layer B is a solid polymer layer). It should be understood that the methods described herein are not limited to any particular number of multiple layers.

In some embodiments, the foam layer(s) may have a different polymer composition than the solid polymer layer(s) in the multi-layer sheet. Though, in some embodiments, the foam layer(s) may have the same polymer composition as the solid polymer layer(s) in the multi-layer sheet.

The multi-layer precursor sheet may be formed in an extrusion process, as described further below. For example, the multi-layer precursor sheet may be formed in a co-extrusion process which involves forming one or more foam layers (e.g., using a first extruder using processing parameters suitable for extruding the foam layer) and forming one or more solid polymer layers (e.g., using a second extruder using processing parameters suitable for extruder the solid polymer layer). The processing parameters of the foam sheet(s) can be controlled to give a wide range of densities or cell sizes for the foam layer.

In some embodiments, at least one layer of the precursor sheet is a microcellular foam. Microcellular foam has an average cell size of less than 100 micron. In some embodiments, the average cell size of a foam layer of the precursor sheet and/or thermoformed article is 200 micron or less (e.g., between 5 microns and 200 micron), and/or with a minimum cell density of approximately $10^5$ cells/cubic centimeter. In some embodiments, the average cell size of the precursor sheet and/or thermoformed article may be less than 125 micron; in some embodiments, less than 100 micron; in some embodiments, less than 75 micron; and, in some embodiments, less than 50 micron.

The foam layer or layers of the precursor sheet can have a wide range of densities. For example, in some cases a polyolefin layer has a density between 0.04 $g/cm^3$ and 0.9 $g/cm^3$.

As noted above, the density reduction of the foam layer(s) may be between 5% and 50% as compared to the solid polymer. In some embodiments, the density reduction in the foam layer is between 10% and 40%. In some embodiments, the density reduction is between 5% and 15%. In some embodiments the foam layer has a density reduction of up to 60%.

The final formed article can have a total density less than the equivalent volume of the precursor sheet.

In another embodiment of this invention, the average density reduction is used to enable use of low cost fillers in the precursor sheet. In this embodiment the final weight of the formed article may be higher than an equivalent solid sheet without filler but total cost of materials will be less.

In another embodiment, two or more different layers of polymer in the multi-layer structure may be foamed. When thermoformed the formed article will have a density lower than the precursor sheet.

In yet another embodiment, two adjacent layers may be foamed where density and cell size are controlled so that the layers can provide cell support similar to that provided by an adjacent solid layer.

In certain embodiments, it has been found that solid layers one or more layers removed from the foam layer are sufficient to enable the foam cells to be strong enough for thermoforming.

In some embodiments, all layers in a multi-layer structure may be foamed in the precursor sheet and the thermoformed article has a lower density than the precursor sheet.

In some embodiments, advantageously, this density reduction in one or more layers of a multi-layer sheet and thermoformed articles may be applied to sheet structures incorporating polymer types generally accepted as not suitable for foaming, e.g., polymers that have low melt strength or characteristics that do not readily entrap the gas used for foaming.

In addition, in some embodiments, it may be observed that there is little or no rupturing of the cells into the interface with the adjacent layer.

In some embodiments of the invention, the precursor sheet has a thickness of less than 3 mm; and, in some embodiments, less than 1 mm thick. A further advantage of certain embodiments of the invention is that the foamed layer or layers may be incorporated in to a range of sheet thicknesses, e.g., 1 mm to 6 mm.

A further advantage of certain embodiments of the invention is that the foam layer or layers in the multi-layer sheet can very thin or relatively thick, e.g., from 0.05 mm to 4 mm.

In another embodiment foam layers of less than 0.05 mm are possible.

The precursor sheet may incorporate but is not limited to blends of polymers or other components such as nucleating aids, fillers, plasticizers, processing aids, color or lubricants. Nucleating aids may permit a reduction in the amount of blowing agent used.

Figure 1A:
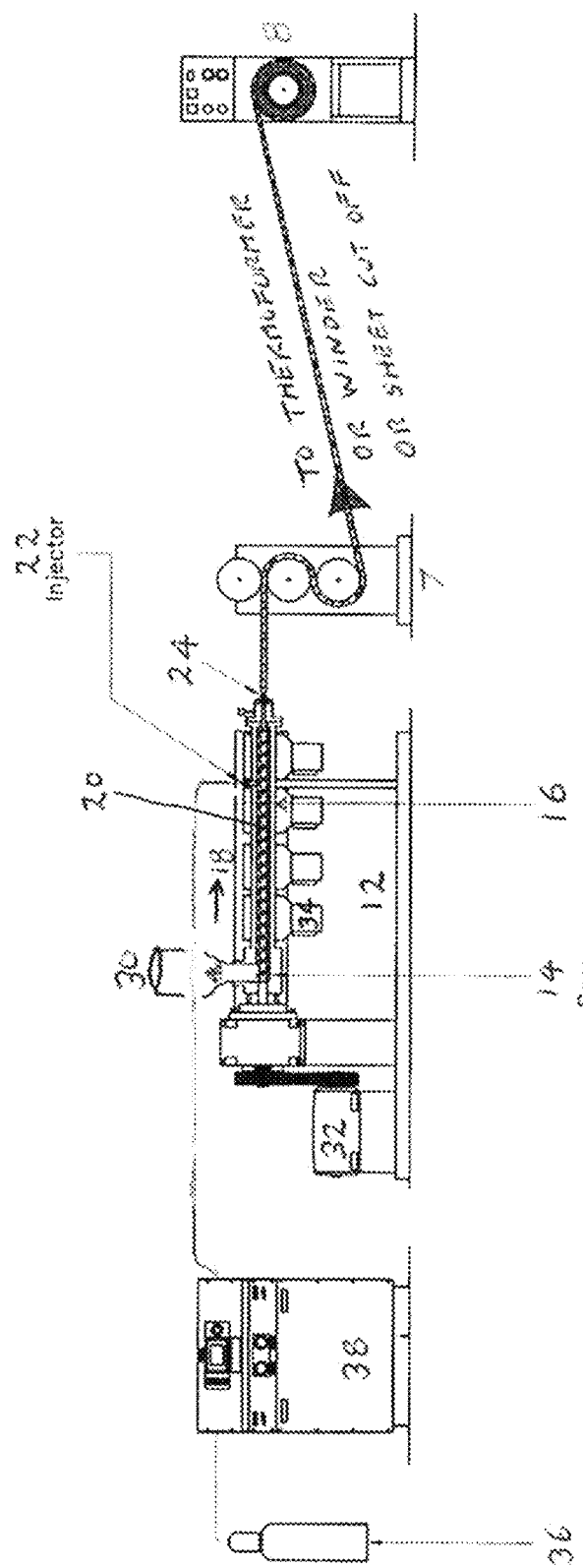

Referring now to FIG. 1 and FIG. 1A, a polymer processing system 10 suitable for forming the foam layer(s) of the precursor sheet described herein is illustrated schematically. The system includes an extruder 12 which houses a screw 14 that rotates within a barrel 16 to convey, in a downstream direction 18, polymeric material in a processing space 20 between the screw and the barrel. A blowing agent is introduced into the stream of polymeric material, for example, through a blowing agent port 22. The stream of polymeric material and blowing agent is extruded through a die 24 fluidly connected to the processing space and fixed to a downstream end of the barrel. In some embodiments, the die is in the form of a flat sheet die and the extrudate from the die is fed directly into the nip of a multi-roll stack 7 to prevent or limit the expansion of the blowing agent.

Although not illustrated, a second extrusion system may be used to form one or more solid polymer layers of the precursor sheet, for example, by co-extruding such layers with the foam layer(s) through the die to form the precursor sheet.

As described further below, the precursor sheet may be fed directly in-line to a thermoformer; and, in other embodiments, the sheet may be collected and then fed directly to the thermoformer (off-line thermoforming).

It should be understood that the above depicts a representative thermoforming system though other types of thermoforming systems may also be used to produce the thermoformed foam article.

The polymeric material may be introduced into the extruder using a standard hopper 30. The screw is connected, at its upstream end, to a drive motor 32 which rotates the screw within the barrel. Positioned along the barrel are temperature control units 34. The control units can be electrical heaters, can include passageways for temperature control fluid, and or the like. Units can be used to heat a stream of polymeric material within the barrel to facilitate melting, and/or to cool the stream to control viscosity. The temperature control units can operate differently at different locations along the barrel, that is, to heat at one or more locations, and to cool at one or more different locations. Any number of temperature control units can be provided. Temperature control units can also be supplied to heat the die to which the extrusion system is connected.

In a typical process, polymeric material in pellet form is introduced into the polymeric processing space from the hopper. The polymeric material is conveyed in a downstream direction as the screw rotates. Heat and shear forces arising from the rotating screw, act to soften and melt the pellets into a uniform fluid stream substantially free of air pockets.

As noted above, the process involves using a blowing agent. In some embodiments and as shown in FIG. 1, a physical blowing agent may be introduced into the stream of polymeric material through the blowing agent port. In other embodiments, a chemical blowing agent may be used. The chemical blowing agent may be used along with, or instead, of a physical blowing agent. The chemical blowing agents may be blended with, or added to, the polymeric material pellets or otherwise introduced into the stream. A blowing agent port may not be utilized when using a chemical blowing agent. Any of a wide variety of known chemical blowing agents may be used, for example, azodicarbonamide (ADCA), oxybisbenzenesulfonylhydrazide (OBSH), p-toluenesulfonylhydrazide (TSH), benzenesulfonylhydrazide (BSH), N,N'-dinitrosopentamethylenetetramine (DNPT), p-toluenesulfonylsemicarbazide (TSS), 5-phenyltetrazole (5PT), citric acid, sodium bicarbonate, monosodium citrate, or combinations of the above.

In embodiments in which a physical blowing agent is used, the physical blowing agent can be introduced from a blowing agent source 36 connected to the blowing agent port. Any of a wide variety of physical blowing agents known to those of ordinary skill in the art such as hydrocarbons, chlorofluorocarbons (CFC), hydrofluorocarbons (HFC), hydrochlorofluorocarbons (HCFC), nitrogen, argon, carbon dioxide, and mixtures thereof, can be used. In some preferred embodiments, the source provides an atmospheric gas (e.g., carbon dioxide or nitrogen, or a mixture thereof) as a blowing agent. It may be advantageous to use atmospheric blowing agents in some cases, rather than hydrocarbons (e.g., butane) which may be explosive and/or have negative impact on the environment. Blowing agents that are in the supercritical state in the extruder may be preferred in some embodiments, particularly supercritical carbon dioxide and nitrogen.

In some embodiments carbon dioxide is used in combination with other blowing agents, for example nitrogen, and in other embodiments carbon dioxide is used alone with no other blowing agents present. In other embodiments carbon dioxide can be used with other blowing agents so long as the other blowing agents do not materially alter the blowing process. When nitrogen is used, similarly it can be used alone, in combination with another blowing agent (e.g. carbon dioxide) that adds to or changes the blowing agent properties, or in combination with another agent that does not materially change the blowing process.

In embodiments that utilize physical blowing agents, the thermoformed articles may be substantially free of residual chemical blowing agents or by-products of chemical blowing agents. Such articles may have certain advantages in some applications, for example, where high purity is required.

A pressure and metering device 38 typically is provided between the blowing agent source and the port.

In embodiments that utilize an annular die, a cooling can is sometimes used in place of or in addition to cooling rolls.

The sheet may then be trimmed or cut to size and finally wound on a roll 8 or cut into individual lengths.

As mentioned above, in some embodiments (e.g., in-line thermoforming) the sheet goes from the cooling section(s) directly to the thermoformer. In other embodiments (e.g., off-line thermoforming), the sheet may be collected and then fed directly to the thermoformer.

Thermoforming generally involves heating the precursor sheet to a softening point or forming temperature, formed to the desired shape in a mold, and trimmed to create the finished product. For example, the precursor sheet is pre heated in an oven to a high-enough temperature that it can be pushed or stretched into a female mold or over a male mold. When in the mold, the formed sheet is cooled so as to hold its final shape.

The adjustment and configuration of the thermoformer machine may be modified to enhance the density reduction achieved by forming the precursor sheet. In some embodiments, the methods described herein use relatively low temperatures and pressures which can help prevent cell collapse in the foam layer(s) which otherwise may happen. For example, high pressure and/or high temperature will simply crush the cells flat, so temperature and pressure may be controlled to enhance low density sections or create higher density sections as required for the product. In some cases, typical pre-heat temperature for precursor sheets including a polyolefin foam layer may be 120-160° C.

In some embodiments, the design of the plug used in plug assist to promote further the benefit in density reduction from the multi-layer sheet. Design of the plug in conjunction with cell size distribution enables the controlled location of density reduction areas in the formed product. The established, but not widely used, technology of altering plug shape and plug material to control the shape and definition a solid thermoformed article are adapted to control foam sheet density distribution. U.S. Pat. No. 8,075,835 gives an examples of using syntactic material as a plug for solid sheet thermoformed products.

As noted above, the methods described herein can be used to produce a variety of thermoformed articles suitable for use in many different applications.

The thermoformed articles include multiple layers including one or more foam layer, as noted above, in connection with the precursor foamed sheet. That is, the thermoformed articles include the same layer construct as described above. In some embodiments, the thermoformed articles include two or more layers (e.g., 2-9 layers); and, one or more foam layers in the thermoformed articles are adjacent to at least one solid polymer layer; and, in some cases, one or more foam layers is/are sandwiched between two adjacent solid polymer layers. T In some embodiments, the foam layer(s) may have a different polymer composition than the solid polymer layer(s) in the multi-layer sheet. Though, in some embodiments, the foam layer(s) may have the same polymer composition as the solid polymer layer(s) in the multi-layer sheet.

In some embodiments, at least one layer of the thermoformed article is a microcellular foam. Microcellular foam has an average cell size of less than 100 micron. In some embodiments, the average cell size of a foam layer of the thermoformed article is 200 micron or less (e.g., between 5 microns and 200 micron), and/or with a minimum cell density of approximately $10^5$ cells/cubic centimeter. In some embodiments, the average cell size of the thermoformed article may be less than 125 micron; in some embodiments, less than 100 micron; in some embodiments, less than 75 micron; and, in some embodiments, less than 50 micron.

The foam layer or layers of the thermoformed article can have a wide range of densities. For example, in some cases a polyolefin layer has a density between 0.04 g/cm$^3$ and 0.9 g/cm$^3$.

The thermoformed article can have a density equal to or less than a density of the multi-layer precursor sheet. The density reduction of the foam layer(s) in the thermoformed articles may be between 5% and 50% as compared to the solid polymer. In some embodiments, the density reduction in the foam layer of the thermoformed article is between 10% and 40%. In some embodiments, the density reduction is between 5% and 15%. In some embodiments the foam layer in the thermoformed article has a density reduction of up to 60%.

In some embodiments, two or more different layers in the multi-layer structure may be foamed. In some embodiments, all layers in a multi-layer structure may be foamed in the precursor sheet and the thermoformed article has a lower density than the precursor sheet.

In some embodiments, the methods described herein enable deep draw thermoformed articles to be formed. A draw ratio is the ratio of the depth of the article to its opening dimension at the top. For example, the thermoformed articles may have a draw ratio of greater than 0.3. In some embodiments, the draw ratio is greater than 0.5; in some embodiments, greater than 0.7; in some embodiments, a draw ratio of greater than 1.0; in some embodiments; a draw ratio of greater than 1.5; in some embodiments, a draw ratio of greater than 2.0; in some embodiments, a draw ratio of greater than 3.0; and, in some embodiments, a draw ratio of greater than 4.0.

The function and advantage of these and other embodiments of the present invention will be more fully understood from the examples below. The following examples are intended to illustrate the benefits of the present invention, but do not exemplify the full scope of the invention.

EXAMPLES

The examples primarily concern the center layer of a 3 layer structure in ABA or ABC configuration.

In addition, 4 layer ABCA and 5 layer ABCBA have been tried. The significant factor for this invention is that the foam layer has a solid layer on either side so there is every reason to assume 9 layer or more structures will be equally suitable.

Number of layers and asymmetric or symmetrical the structures do not have any effect on the foaming process.

Primary Test configuration. An ABC layer configuration was made using a 3-extruder setup. The A and C layers were not foamed. The A and C layers were similar polymers to the center foam layer The B layer was foamed. The B layer can be a blend of more than one polymer.

A stream of polymer was created in the B layer extruder. Gas was introduced through a multi-hole injector mounted on the extruder barrel into the polymer stream and creates a mixture of gas and polymer. The percentage of gas by weight was <2.5 wt % of the total mixture. In addition to the gas, a nucleation agent was used in some cases. After gas injection, the melt stream and its components were mixed together by the screw to form a single-phase solution.

The three polymer streams where brought together and distributed in a co-extrusion block and subsequently entered a flat die. The melt temperature was controlled such that cell nucleation and growth would occur.

Upon exit of the die, the polymer and the gas separate from the single phase solution while being cooled and calibrated through a series of quenching rolls. The result is a foamed core with solid skin layers with a density reduction in the inner layer. The foamed B layer structure is not visible because the cellular structure is trapped within the two solid A and C layers. The average cell size in the core layer is typically <100 microns.

Example sheets were made on larger size lab equipment and full size commercial lines.

Gasses used were Nitrogen or Carbon dioxide

Example 1—Polystyrene Food Service Trays

This example illustrates the production of a food service tray. The foam layer was a mixture of polystyrene (PS) and high impact polystyrene (HIPS). The ratio of the layers by volume was 1:3:1.

A stream of PS was created in the extruder. Nitrogen was introduced through a multi-hole injector mounted on the extruder barrel into the polymer stream and creates a mixture of nitrogen and polystyrene. The percentage of nitrogen by weight was <1 wt % of the total mixture. In addition to the nitrogen a nucleation agent was used at a level <20 wt % was added. The stream and its components were mixed together with a low energy screw mixer design to form a single-phase solution.

The die had an exit gap less than 750 microns. The melt temperature was several degrees lower than for solid polymer.

Upon exit from the die, the polymer and the nitrogen separate from the single phase solution and are cooled and calibrated through a series of quenching rolls. The result was a foamed core with solids skin layers with an overall density of 0.837 g/cc. This is approximately a 32% reduction in density of the foam layer by weight compared to a solid sheet from the same material. The average cell size was <50 microns.

The sheet was rolled on a tension winder. Rolled sheets are then fed into a thermoforming machine. The sheet was heated to a specific temperature for a specific time period before a controlled vacuum is drawn over the mold in which the sheet inherits the mold detail. The mold is then cooled and removed from the machine. Edge trim is removed as appropriate.

The resulting formed sheet was measured in two place; the bottom of the tray and the side wall. The results were as shown in Table 1. The results are a product of an average of 5 samples measured.

TABLE 1

Density and thickness before and after thermoforming.

| Measurement | Density (g/cc) | Thickness (microns) |
|---|---|---|
| Sheet (Start) | 0.837 | 863.6 |
| Bottom of tray (end) | 0.746 | 584.2 |
| Side wall of tray (end) | 0.746 | 533.4 |

Example 2—PET Food Service Trays

This example illustrates the production of a food service tray.

The polymer was a mixture of crystalline polyethylene terephthalate (PET) and melt strength additive. The PET resin had an intrinsic viscosity (IV) <1.0.

A stream of PET was created in the extruder. Nitrogen was introduced through a multi-hole injector mounted on the extruder barrel into the polymer stream and creates a mixture of nitrogen and PET. The percentage of gas by weight was <1.5 wt % of the total mixture. In addition a nucleation agent was used at a level <15 wt % was added to extruder. The stream and its components were mixed together in the screw design to form a single-phase solution.

The die had an exit gap less than 750 microns. Upon exit of this die, the sheet was cooled and calibrated through a series of 3 quenching rolls. The result was a foamed PET had a density of 0.862 g/cc. This is approximately a 39% reduction in density by weight. Un-foamed sheet has a density of around 1.4 g/cc. The average cell size was <45 microns.

The sheet was rolled on a tension winder. Rolled sheets are then fed into a thermoforming machine. The sheet was heated and then molded by a controlled vacuum; the sheet inherits the mold detail. The mold was then cooled and removed from the machine. Edge trim is removed as appropriate.

The resulting sheet was measured in two place; the bottom of the tray and the side wall. The results were as shown in Table 2. The results are a product of an average of 5 samples measured.

TABLE 2

Density and thickness before and after thermoforming.

| Measurement | Density (g/cc) | Thickness (microns) |
| --- | --- | --- |
| Sheet (Start) | 0.862 | 939 |
| Bottom of tray (end) | 0.711 | 635 |
| Side wall of tray (end) | 0.702 | 609 |

Example 3—Polypropylene Frozen Food Trays

This example illustrates the production of a food tray including a homopolymer polypropylene (h-PP) polymeric foam layer.

A stream of PP was created in the extruder. Gas was introduced through a multi-hole injector mounted on the extruder barrel into the polymer stream and creates a mixture of gas and PP. The percentage of gas by weight was <1 wt % of the total mixture. In addition a nucleation agent was used at a level <14 wt % was added to extruder. The stream and its components were mixed together in the screw to form a single-phase solution.

The die had an exit gap less than 750 microns. The melt temperature was cooled so that cell growth could be constrained.

The sheet was cooled and calibrated through a series of quenching rolls. The result is foamed PP sheet with a density of 0.724 g/cc. This is approximately a 20% reduction in density by weight given that solid sheet has a density of around 0.9 g/cc. In the foamed section the cells are nearly invisible due to the small cell size. The average cell size was <35 micron to <50 microns.

The sheet was rolled on a tension winder. Rolled sheets were then fed into a thermoforming machine. The sheet was heated to a specific temperature for a specific time period before a controlled vacuum is drawn over the mold in which the sheet inherits the mold detail. The mold is then cooled and removed from the machine. Edge trim is removed as appropriate.

The resulting sheet was measured in two place; the bottom of the tray and the side wall. The results were as shown in Table 3. The results are a product of an average of 5 samples measured.

TABLE 3

Density and thickness before and after thermoforming.

| Measurement | Density (g/cc) | Thickness (microns) |
| --- | --- | --- |
| Sheet (Start) | 0.724 | 1092 |
| Bottom of tray (end) | 0.654 | 558 |
| Side wall of tray (end) | 0.659 | 635 |

Example 4—Polystyrene Food Service Trays

This example illustrates the production of a medium draw food tray. The foamed polymer was a mixture of polystyrene (GPPS) and high impact polystyrene (HIPS).

A stream of PS was created in the extruder. Gas was introduced through a multi-hole injector mounted on the extruder barrel into the polymer stream and creates a mixture of gas and polystyrene. The percentage of gas by weight was <1.5 wt % of the total mixture. In addition to the gas, a nucleation agent was used at a level <10 wt % was added to extruder. The stream and its components were mixed together in the screw to form a single-phase solution.

The die had an exit gap less than 750 microns. The melt temperature was controlled such that cell nucleation and growth would occur.

Upon exit of this die, the sheet was cooled and calibrated through a series of quenching rolls. The result was foamed PP with a density of 0.763 g/cc. This is approximately a 28% reduction in density by weight given; un-foamed sheet has a density of around 1.05 g/cc. The average cell size was <50 microns.

The sheet was rolled on a tension winder. Rolled sheets were then fed into a thermoforming machine. The sheet was heated prior to being positioned for molding, and then a controlled vacuum was drawn over the mold from which the sheet inherits the mold detail. The mold was then cooled and removed from the machine. Edge trim is removed as appropriate.

The resulting sheet was measured in two place; the bottom of the tray and the side wall. The results were as shown in Table. The results are a product of an average of 5 samples measured.

TABLE 4

Density and thickness before and after thermoforming.

| Measurement | Density (g/cc) | Thickness (microns) |
| --- | --- | --- |
| Sheet (Start) | 0.763 | 1041 |
| Bottom of tray (end) | 0.599 | 711 |
| Side wall of tray (end) | 0.607 | 762 |

Example 5—Polystyrene Inline Food Trays

This example illustrates the production of a medium draw food tray by inline thermoforming.

The foamed polymer was a mixture of polystyrene M6.90.2 (GPPS) and high impact polystyrene (HIPS).

A stream of PS was created in the extruder. Gas was introduced through a multi-hole injector mounted on the extruder barrel into the polymer stream and creates a mixture of gas and polystyrene. The percentage of gas by weight was <1.5 wt % of the total mixture. In addition to the gas, a nucleation agent was used at a level <10 wt % was added to extruder. The stream and its components were mixed together in the screw to form a single-phase solution.

The die had an exit gap less than 650 microns. The melt temperature was controlled such that cell nucleation and growth would occur.

Upon exit of this die, the sheet was cooled and calibrated through a series of quenching rolls. The result was foamed PS with a density of 0.767 g/cc. This is approximately a 28% reduction in density by weight given; un-foamed sheet has a density of around 1.05 g/cc. The average cell size was <50 microns.

The sheet was fed into a thermoforming machine. The sheet was partially re-heated prior to being positioned for molding, and then a controlled vacuum was drawn over the mold from which the sheet inherits the mold detail. The mold was then cooled and removed from the machine. Edge trim is removed as appropriate.

The resulting sheet was measured in two place; the bottom of the tray and the side wall. The results were as shown in Table 5. The results are a product of an average of 5 samples measured.

TABLE 5

Density before and after thermoforming.

| Measurement | Density (g/cc) |
|---|---|
| Sheet (Start) | 0.787 |
| Bottom of tray (end) | 0.749 |
| Side wall of tray (end) | 0.750 |

What is claimed is:

1. A method of forming a foam article comprising:
providing a multi-layer precursor sheet including multiple layers and a polymer foam layer, wherein the polymer foam layer is sandwiched between two solid polymer layers;
thermoforming the multi-layer precursor sheet to form a thermoformed article including multiple layers, wherein the thermoformed article is a container;
immediately filling the container with food contents; and immediately sealing the container,
wherein one of the layers of the thermoformed article is a polymer foam layer having an average cell size of less than about 100 micron and having a density of reduction between 5% and 50%, and
wherein the thermoformed article has a density equal to or less than a density of the multi-layer precursor sheet.

2. The method of claim 1, wherein the thermoformed article comprises one or more layers of microcellular polymer foam material.

3. The method of claim 1, wherein the precursor multi-layer sheet comprises one or more layers of microcellular polymer foam material.

4. The method of claim 1, wherein the thickness of the article is greater than the thickness of the precursor multi-layer foam sheet.

5. The method of claim 1, wherein the thickness of the article is at least 20% greater than the thickness of the multi-layer precursor sheet.

6. The method of claim 1, wherein the thickness of the article is at least 10% greater than the thickness of the multi-layer precursor sheet.

7. The method of claim 1, wherein the thickness of the article is at least 5% greater than the thickness of the multi-layer precursor sheet.

8. The method of claim 1, wherein the polymer foam layer of the multi-layer precursor sheet has a cell size less than about 50 micron.

9. The method of claim 1, wherein the thermoformed article has a draw ratio of greater than 1.0.

10. The method of claim 1, wherein the thermoformed article has a draw ratio of greater than 2.0.

11. The method of claim 1, wherein the polymer foam layer of the thermoformed article has a density reduction of at least 5% compared to solid polymer.

12. The method of claim 1, wherein the polymer foam layer of the thermoformed article has a density reduction of at least 20% compared to solid polymer.

* * * * *